US010020979B1

(12) United States Patent
Oshiba et al.

(10) Patent No.: US 10,020,979 B1
(45) Date of Patent: Jul. 10, 2018

(54) ALLOCATING RESOURCES IN MULTI-CORE COMPUTING ENVIRONMENTS

(71) Applicant: A10 NETWORKS, INC., San Jose, CA (US)

(72) Inventors: Dennis Oshiba, Fremont, CA (US); Hong Xiao, Pleasanton, CA (US)

(73) Assignee: A10 NETWORKS, INC., San Jose, CA (US)

( * ) Notice: Subject to any disclaimer, the term of this patent is extended or adjusted under 35 U.S.C. 154(b) by 584 days.

(21) Appl. No.: 14/225,377

(22) Filed: Mar. 25, 2014

(51) Int. Cl.
G06F 15/173 (2006.01)
H04L 12/24 (2006.01)

(52) U.S. Cl.
CPC .................................. H04L 41/00 (2013.01)

(58) Field of Classification Search
CPC . H04L 67/10; H04L 67/1002; H04L 67/1008; H04L 67/1014; H04L 67/1023; H04L 67/1036; H04L 67/1038; H04L 41/00
USPC ........ 709/203, 217, 218, 219, 234, 241, 243
See application file for complete search history.

(56) References Cited

U.S. PATENT DOCUMENTS

| 4,720,850 A | 1/1988 | Oberlander et al. |
| 4,864,492 A | 9/1989 | Blakely-Fogel et al. |
| 4,882,699 A | 11/1989 | Evensen |
| 5,218,676 A | 6/1993 | Ben-Ayed et al. |
| 5,293,488 A | 3/1994 | Riley et al. |
| 5,432,908 A | 7/1995 | Heddes et al. |
| 5,774,660 A | 6/1998 | Brendel et al. |
| 5,781,550 A | 7/1998 | Templin et al. |
| 5,862,339 A * | 1/1999 | Bonnaure ........... H04L 12/2856 709/217 |
| 5,875,185 A | 2/1999 | Wang et al. |
| 5,931,914 A | 8/1999 | Chiu |
| 5,958,053 A | 9/1999 | Denker |
| 6,003,069 A | 12/1999 | Cavill |

(Continued)

FOREIGN PATENT DOCUMENTS

| CN | 1372662 A | 10/2002 |
| CN | 1473300 A | 2/2004 |

(Continued)

OTHER PUBLICATIONS

Chiussi et al., "A Network Architecture for MPLS-Based Micro-Mobility", IEEE WCNC 02, Orlando, Mar. 2002.

(Continued)

*Primary Examiner* — Davoud Zand
(74) *Attorney, Agent, or Firm* — AMPACC Law Group, LLP; Keith Kline

(57) ABSTRACT

Provided are methods and systems for allocating resources in a multi-core computing environment. The method comprises selecting, by one or more processors, at least one dedicated core for execution of a resource allocation algorithm. After selection of the dedicated core, the dedicated core allocates, based on the resource allocation algorithm, a network resource to a client. Furthermore, the dedicated core assigns the network resource to network packets associated with the client for processing by data cores. After the assigning of the network resource, the data cores process the network packets according to the allocated network resource.

20 Claims, 6 Drawing Sheets

(56) References Cited

U.S. PATENT DOCUMENTS

| | | | |
|---|---|---|---|
| 6,047,268 A | 4/2000 | Bartoli et al. |
| 6,075,783 A | 6/2000 | Voit |
| 6,131,163 A | 10/2000 | Wiegel |
| 6,141,749 A | 10/2000 | Coss et al. |
| 6,167,428 A | 12/2000 | Ellis |
| 6,321,338 B1 | 11/2001 | Porras et al. |
| 6,324,286 B1 | 11/2001 | Lai et al. |
| 6,360,265 B1 | 3/2002 | Falck et al. |
| 6,363,075 B1 | 3/2002 | Huang et al. |
| 6,374,300 B2 | 4/2002 | Masters |
| 6,389,462 B1 | 5/2002 | Cohen et al. |
| 6,415,329 B1 | 7/2002 | Gelman et al. |
| 6,456,617 B1 | 9/2002 | Oda et al. |
| 6,483,600 B1 | 11/2002 | Schuster et al. |
| 6,519,243 B1 | 2/2003 | Nonaka et al. |
| 6,535,516 B1 | 3/2003 | Leu et al. |
| 6,578,066 B1 | 6/2003 | Logan et al. |
| 6,587,866 B1 | 7/2003 | Modi et al. |
| 6,600,738 B1 | 7/2003 | Alperovich et al. |
| 6,658,114 B1 | 12/2003 | Farn et al. |
| 6,772,205 B1 | 8/2004 | Lavian et al. |
| 6,772,334 B1 | 8/2004 | Glawitsch |
| 6,779,033 B1 | 8/2004 | Watson et al. |
| 6,804,224 B1 | 10/2004 | Schuster et al. |
| 6,832,322 B1 | 12/2004 | Boden et al. |
| 7,010,605 B1 | 3/2006 | Dharmarajan |
| 7,013,338 B1 | 3/2006 | Nag et al. |
| 7,058,718 B2 | 6/2006 | Fontes et al. |
| 7,058,789 B2 | 6/2006 | Henderson et al. |
| 7,058,973 B1 | 6/2006 | Sultan |
| 7,069,438 B2 | 6/2006 | Balabine et al. |
| 7,086,086 B2 | 8/2006 | Ellis |
| 7,111,162 B1 | 9/2006 | Bagepalli et al. |
| 7,143,087 B2 | 11/2006 | Fairweather |
| 7,167,927 B2 | 1/2007 | Philbrick et al. |
| 7,181,524 B1 | 2/2007 | Lele |
| 7,228,359 B1 | 6/2007 | Monteiro |
| 7,254,133 B2 | 8/2007 | Govindarajan et al. |
| 7,266,604 B1 | 9/2007 | Nathan et al. |
| 7,269,850 B2 | 9/2007 | Govindarajan et al. |
| 7,284,272 B2 | 10/2007 | Howard et al. |
| 7,290,050 B1 | 10/2007 | Smith et al. |
| 7,301,899 B2 | 11/2007 | Goldstone |
| 7,308,710 B2 | 12/2007 | Yarborough |
| 7,310,686 B2 | 12/2007 | Uysal |
| 7,328,267 B1 | 2/2008 | Bashyam et al. |
| 7,337,241 B2 | 2/2008 | Boucher et al. |
| 7,343,399 B2 | 3/2008 | Hayball et al. |
| 7,370,100 B1 | 5/2008 | Gunturu |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,406,709 B2 | 7/2008 | Maher, III et al. |
| 7,423,977 B1 | 9/2008 | Joshi |
| 7,430,755 B1 | 9/2008 | Hughes et al. |
| 7,441,270 B1 | 10/2008 | Edwards et al. |
| 7,451,312 B2 | 11/2008 | Medvinsky et al. |
| 7,467,202 B2 | 12/2008 | Savchuk |
| 7,506,360 B1 | 3/2009 | Wilkinson et al. |
| 7,512,980 B2 | 3/2009 | Copeland et al. |
| 7,516,485 B1 | 4/2009 | Lee et al. |
| 7,529,242 B1 | 5/2009 | Lyle |
| 7,552,323 B2 | 6/2009 | Shay |
| 7,568,041 B1 | 7/2009 | Turner et al. |
| 7,583,668 B1 | 9/2009 | Mayes et al. |
| 7,584,262 B1 | 9/2009 | Wang et al. |
| 7,590,736 B2 | 9/2009 | Hydrie et al. |
| 7,591,001 B2 | 9/2009 | Shay |
| 7,603,454 B2 | 10/2009 | Piper |
| 7,610,622 B2 | 10/2009 | Touitou et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,711,790 B1 | 5/2010 | Barrett et al. |
| 7,716,369 B2 | 5/2010 | Le Pennec et al. |
| 7,733,866 B2 | 6/2010 | Mishra et al. |
| 7,747,748 B2 | 6/2010 | Allen |
| 7,779,130 B1 | 8/2010 | Toutonghi |
| 7,826,487 B1 | 11/2010 | Mukerji et al. |
| 7,908,651 B2 | 3/2011 | Maher |
| 7,948,952 B2 | 5/2011 | Hurtta et al. |
| 7,965,727 B2 | 6/2011 | Sakata et al. |
| 7,979,694 B2 | 7/2011 | Touitou et al. |
| 7,990,847 B1 | 8/2011 | Leroy et al. |
| 7,992,201 B2 | 8/2011 | Aldridge et al. |
| 8,079,077 B2 | 12/2011 | Chen et al. |
| 8,081,640 B2 | 12/2011 | Ozawa et al. |
| 8,090,866 B1 | 1/2012 | Bashyam et al. |
| 8,099,492 B2 | 1/2012 | Dahlin et al. |
| 8,116,312 B2 | 2/2012 | Riddoch et al. |
| 8,122,116 B2 | 2/2012 | Matsunaga et al. |
| 8,151,019 B1* | 4/2012 | Le ..................... G06F 5/065 |
| | | 710/15 |
| 8,185,651 B2 | 5/2012 | Moran et al. |
| 8,244,876 B2 | 8/2012 | Sollee |
| 8,255,644 B2 | 8/2012 | Sonnier et al. |
| 8,261,339 B2 | 9/2012 | Aldridge et al. |
| 8,291,487 B1 | 10/2012 | Chen et al. |
| 8,327,128 B1 | 12/2012 | Prince et al. |
| 8,332,925 B2 | 12/2012 | Chen et al. |
| 8,347,392 B2 | 1/2013 | Chess et al. |
| 8,379,515 B1 | 2/2013 | Mukerji |
| 8,387,128 B1 | 2/2013 | Chen et al. |
| 8,464,333 B1 | 6/2013 | Chen et al. |
| 8,520,615 B2 | 8/2013 | Mehta et al. |
| 8,559,437 B2 | 10/2013 | Mishra et al. |
| 8,560,693 B1 | 10/2013 | Wang et al. |
| 8,595,383 B2 | 11/2013 | Chen et al. |
| 8,595,819 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,782,221 B2 | 7/2014 | Han |
| 8,904,512 B1 | 12/2014 | Chen et al. |
| 8,914,871 B1 | 12/2014 | Chen et al. |
| 8,918,857 B1 | 12/2014 | Chen et al. |
| RE45,347 E | 1/2015 | Chun et al. |
| 8,943,577 B1 | 1/2015 | Chen et al. |
| 8,949,471 B2* | 2/2015 | Hall ..................... H04L 29/06 |
| | | 709/250 |
| 8,977,749 B1 | 3/2015 | Han |
| 9,032,502 B1 | 5/2015 | Chen et al. |
| 9,094,364 B2 | 7/2015 | Jalan et al. |
| 9,106,561 B2 | 8/2015 | Jalan et al. |
| 9,118,618 B2 | 8/2015 | Davis |
| 9,118,620 B1 | 8/2015 | Davis |
| 9,124,550 B1 | 9/2015 | Chen et al. |
| 9,137,301 B1 | 9/2015 | Dunlap et al. |
| 9,154,584 B1 | 10/2015 | Han |
| 9,258,332 B2 | 2/2016 | Chen et al. |
| 9,386,088 B2 | 7/2016 | Zheng et al. |
| 9,531,846 B2 | 12/2016 | Han et al. |
| 2001/0015812 A1 | 8/2001 | Sugaya |
| 2001/0023442 A1 | 9/2001 | Masters |
| 2001/0042200 A1 | 11/2001 | Lamberton et al. |
| 2002/0026515 A1 | 2/2002 | Michielsens et al. |
| 2002/0026531 A1 | 2/2002 | Keane et al. |
| 2002/0032799 A1 | 3/2002 | Wiedeman et al. |
| 2002/0046348 A1 | 4/2002 | Brustoloni |
| 2002/0053031 A1 | 5/2002 | Bendinelli et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0138618 A1 | 9/2002 | Szabo |
| 2002/0141386 A1 | 10/2002 | Minert et al. |
| 2002/0141448 A1 | 10/2002 | Matsunaga |
| 2002/0143955 A1 | 10/2002 | Shimada et al. |
| 2002/0143991 A1 | 10/2002 | Chow et al. |
| 2002/0188678 A1 | 12/2002 | Edecker et al. |
| 2003/0009591 A1 | 1/2003 | Hayball et al. |
| 2003/0035409 A1 | 2/2003 | Wang et al. |
| 2003/0061506 A1 | 3/2003 | Cooper et al. |

(56) References Cited

U.S. PATENT DOCUMENTS

| | | |
|---|---|---|
| 2003/0065950 A1 | 4/2003 | Yarborough |
| 2003/0081624 A1 | 5/2003 | Aggarwal et al. |
| 2003/0088788 A1 | 5/2003 | Yang |
| 2003/0135625 A1 | 7/2003 | Fontes et al. |
| 2003/0135653 A1 | 7/2003 | Marovich |
| 2003/0152078 A1 | 8/2003 | Henderson et al. |
| 2003/0167340 A1 | 9/2003 | Jonsson |
| 2003/0229809 A1 | 12/2003 | Wexler et al. |
| 2003/0236887 A1* | 12/2003 | Kesselman ............. H04L 47/10 709/226 |
| 2004/0010545 A1* | 1/2004 | Pandya ................. H04L 29/06 709/203 |
| 2004/0054920 A1 | 3/2004 | Wilson et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0107360 A1 | 6/2004 | Herrmann et al. |
| 2004/0184442 A1 | 9/2004 | Jones et al. |
| 2004/0243718 A1 | 12/2004 | Fujiyoshi |
| 2004/0250059 A1 | 12/2004 | Ramelson et al. |
| 2005/0005207 A1 | 1/2005 | Herneque |
| 2005/0027947 A1 | 2/2005 | Landin |
| 2005/0033985 A1 | 2/2005 | Xu et al. |
| 2005/0036511 A1 | 2/2005 | Baratakke et al. |
| 2005/0038898 A1 | 2/2005 | Mittig et al. |
| 2005/0039033 A1 | 2/2005 | Meyers et al. |
| 2005/0050364 A1 | 3/2005 | Feng |
| 2005/0074001 A1 | 4/2005 | Mattes et al. |
| 2005/0080890 A1 | 4/2005 | Yang et al. |
| 2005/0114492 A1 | 5/2005 | Arberg et al. |
| 2005/0135422 A1 | 6/2005 | Yeh |
| 2005/0144468 A1 | 6/2005 | Northcutt et al. |
| 2005/0163073 A1 | 7/2005 | Heller et al. |
| 2005/0169285 A1 | 8/2005 | Wills et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0251856 A1 | 11/2005 | Araujo et al. |
| 2005/0281190 A1 | 12/2005 | McGee et al. |
| 2006/0023721 A1 | 2/2006 | Miyake et al. |
| 2006/0031506 A1 | 2/2006 | Redgate |
| 2006/0036610 A1 | 2/2006 | Wang |
| 2006/0041745 A1 | 2/2006 | Parnes |
| 2006/0062142 A1 | 3/2006 | Appanna et al. |
| 2006/0063517 A1 | 3/2006 | Oh et al. |
| 2006/0064440 A1 | 3/2006 | Perry |
| 2006/0069804 A1 | 3/2006 | Miyake et al. |
| 2006/0080446 A1 | 4/2006 | Bahl |
| 2006/0126625 A1 | 6/2006 | Schollmeier et al. |
| 2006/0136570 A1* | 6/2006 | Pandya ............. G06F 17/30985 709/217 |
| 2006/0164978 A1* | 7/2006 | Werner ............... H04L 41/0896 370/229 |
| 2006/0168319 A1 | 7/2006 | Trossen |
| 2006/0195698 A1 | 8/2006 | Pinkerton et al. |
| 2006/0227771 A1 | 10/2006 | Raghunath et al. |
| 2006/0230129 A1 | 10/2006 | Swami et al. |
| 2006/0233100 A1 | 10/2006 | Luft et al. |
| 2006/0280121 A1 | 12/2006 | Matoba |
| 2007/0002857 A1 | 1/2007 | Maher |
| 2007/0011419 A1 | 1/2007 | Conti |
| 2007/0019543 A1 | 1/2007 | Wei et al. |
| 2007/0022479 A1 | 1/2007 | Sikdar et al. |
| 2007/0076653 A1* | 4/2007 | Park ................... H04L 12/4633 370/328 |
| 2007/0124487 A1 | 5/2007 | Yoshimoto et al. |
| 2007/0124502 A1 | 5/2007 | Li |
| 2007/0165622 A1 | 7/2007 | O'Rourke et al. |
| 2007/0177506 A1 | 8/2007 | Singer et al. |
| 2007/0180119 A1* | 8/2007 | Khivesara ........... H04L 12/1881 709/226 |
| 2007/0180226 A1 | 8/2007 | Schory et al. |
| 2007/0180513 A1 | 8/2007 | Raz et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1* | 10/2007 | Park ....................... H04L 47/10 375/224 |
| 2007/0243879 A1* | 10/2007 | Park .................... H04L 41/0806 455/453 |
| 2007/0245090 A1 | 10/2007 | King et al. |
| 2007/0248009 A1* | 10/2007 | Petersen ............. H04L 12/4633 370/230 |
| 2007/0294694 A1 | 12/2007 | Jeter et al. |
| 2008/0016161 A1* | 1/2008 | Tsirtsis ..................... G06F 9/546 709/206 |
| 2008/0031263 A1 | 2/2008 | Ervin et al. |
| 2008/0034111 A1 | 2/2008 | Kamath et al. |
| 2008/0034419 A1 | 2/2008 | Mullick et al. |
| 2008/0040789 A1 | 2/2008 | Chen et al. |
| 2008/0076432 A1* | 3/2008 | Senarath ............... H04W 36/18 455/442 |
| 2008/0120129 A1* | 5/2008 | Seubert ................. G06Q 10/06 705/35 |
| 2008/0216177 A1 | 9/2008 | Yokosato et al. |
| 2008/0225722 A1 | 9/2008 | Khemani et al. |
| 2008/0253390 A1* | 10/2008 | Das ..................... H04L 12/5695 370/465 |
| 2008/0289044 A1 | 11/2008 | Choi |
| 2008/0291911 A1 | 11/2008 | Lee et al. |
| 2008/0298303 A1* | 12/2008 | Tsirtsis .................... H04L 69/14 370/328 |
| 2009/0024722 A1 | 1/2009 | Sethuraman et al. |
| 2009/0031415 A1 | 1/2009 | Aldridge et al. |
| 2009/0049537 A1 | 2/2009 | Chen et al. |
| 2009/0077651 A1 | 3/2009 | Poeluev |
| 2009/0092124 A1 | 4/2009 | Singhal et al. |
| 2009/0113536 A1 | 4/2009 | Zhang et al. |
| 2009/0138606 A1 | 5/2009 | Moran et al. |
| 2009/0138945 A1 | 5/2009 | Savchuk |
| 2009/0164614 A1 | 6/2009 | Christian et al. |
| 2009/0210698 A1 | 8/2009 | Candelore |
| 2009/0285196 A1* | 11/2009 | Lee .......................... H04L 47/14 370/345 |
| 2010/0042869 A1 | 2/2010 | Szabo et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0095018 A1 | 4/2010 | Khemani et al. |
| 2010/0106854 A1 | 4/2010 | Kim et al. |
| 2010/0205310 A1 | 8/2010 | Altshuler et al. |
| 2010/0228819 A1 | 9/2010 | Wei |
| 2010/0235522 A1 | 9/2010 | Chen et al. |
| 2010/0238828 A1 | 9/2010 | Russell |
| 2010/0257278 A1 | 10/2010 | Gunturu |
| 2010/0262819 A1* | 10/2010 | Yang ..................... G06F 9/5055 713/2 |
| 2010/0265824 A1 | 10/2010 | Chao et al. |
| 2010/0268814 A1 | 10/2010 | Cross et al. |
| 2010/0318631 A1 | 12/2010 | Shukla |
| 2010/0322252 A1 | 12/2010 | Suganthi et al. |
| 2010/0333101 A1 | 12/2010 | Pope et al. |
| 2010/0333209 A1 | 12/2010 | Alve |
| 2011/0007652 A1 | 1/2011 | Bai |
| 2011/0032941 A1 | 2/2011 | Quach et al. |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0099623 A1 | 4/2011 | Garrard et al. |
| 2011/0149879 A1* | 6/2011 | Noriega ................ H04W 72/1236 370/329 |
| 2011/0209157 A1* | 8/2011 | Sumida ................. G06F 9/5016 718/104 |
| 2011/0276982 A1 | 11/2011 | Nakayama et al. |
| 2011/0302256 A1 | 12/2011 | Sureshehandra et al. |
| 2011/0307606 A1 | 12/2011 | Cobb |
| 2012/0008495 A1 | 1/2012 | Shen et al. |
| 2012/0026897 A1 | 2/2012 | Guichard et al. |
| 2012/0117382 A1 | 5/2012 | Larson et al. |
| 2012/0155495 A1 | 6/2012 | Clee et al. |

(56) References Cited

U.S. PATENT DOCUMENTS

| | | | |
|---|---|---|---|
| 2012/0173759 A1 | 7/2012 | Agarwal et al. | |
| 2012/0215910 A1 | 8/2012 | Wada | |
| 2012/0290727 A1 | 11/2012 | Tivig | |
| 2013/0089099 A1 | 4/2013 | Pollock et al. | |
| 2013/0135996 A1* | 5/2013 | Torres | H04L 41/5022 370/230 |
| 2013/0136139 A1 | 5/2013 | Zheng et al. | |
| 2013/0166762 A1 | 6/2013 | Jalan et al. | |
| 2013/0176854 A1 | 7/2013 | Chisu et al. | |
| 2013/0191486 A1 | 7/2013 | Someya et al. | |
| 2013/0191548 A1 | 7/2013 | Boddukuri et al. | |
| 2013/0212242 A1 | 8/2013 | Mendiratta et al. | |
| 2013/0227165 A1 | 8/2013 | Liu | |
| 2013/0250765 A1 | 9/2013 | Ehsan et al. | |
| 2013/0258846 A1 | 10/2013 | Damola | |
| 2013/0262702 A1 | 10/2013 | Davis | |
| 2013/0311686 A1 | 11/2013 | Fetterman et al. | |
| 2013/0315241 A1 | 11/2013 | Kamat et al. | |
| 2014/0012972 A1 | 1/2014 | Han | |
| 2014/0169168 A1 | 6/2014 | Jalan et al. | |
| 2014/0207845 A1 | 7/2014 | Han et al. | |
| 2014/0258536 A1 | 9/2014 | Chiong | |
| 2014/0286313 A1 | 9/2014 | Fu et al. | |
| 2014/0359052 A1 | 12/2014 | Joachimpillai et al. | |
| 2015/0026794 A1 | 1/2015 | Zuk et al. | |
| 2015/0047012 A1 | 2/2015 | Chen et al. | |
| 2015/0156223 A1 | 6/2015 | Xu et al. | |
| 2015/0207708 A1* | 7/2015 | Raleigh | H04L 41/0893 709/217 |
| 2015/0237173 A1 | 8/2015 | Virkki et al. | |
| 2015/0244566 A1 | 8/2015 | Puimedon | |
| 2015/0296058 A1 | 10/2015 | Jalan et al. | |
| 2015/0312092 A1 | 10/2015 | Golshan et al. | |
| 2015/0350048 A1 | 12/2015 | Sampat et al. | |
| 2015/0350379 A1 | 12/2015 | Jalan et al. | |
| 2015/0350383 A1 | 12/2015 | Davis | |
| 2016/0014052 A1 | 1/2016 | Han | |
| 2016/0014126 A1 | 1/2016 | Jalan et al. | |
| 2016/0065619 A1 | 3/2016 | Chen et al. | |
| 2017/0048107 A1 | 2/2017 | Dosovitsky et al. | |
| 2017/0048356 A1 | 2/2017 | Thompson et al. | |

FOREIGN PATENT DOCUMENTS

| | | |
|---|---|---|
| CN | 1529460 A | 9/2004 |
| CN | 1575582 A | 2/2005 |
| CN | 1910869 A | 2/2007 |
| CN | 1921457 | 2/2007 |
| CN | 1937591 | 3/2007 |
| CN | 101189598 A | 5/2008 |
| CN | 101442425 A | 5/2009 |
| CN | 101495993 | 7/2009 |
| CN | 101682532 A | 3/2010 |
| CN | 101878663 | 11/2010 |
| CN | ZL 200780001807.5 | 2/2011 |
| CN | 102123156 A | 7/2011 |
| CN | 102577252 A | 7/2012 |
| CN | 103365654 | 10/2013 |
| CN | 103428261 | 12/2013 |
| CN | 103533018 A | 1/2014 |
| CN | 101878663 | 6/2014 |
| CN | 103944954 A | 7/2014 |
| CN | 104040990 A | 9/2014 |
| CN | 104137491 A | 11/2014 |
| CN | 104796396 A | 7/2015 |
| CN | 102577252 B | 3/2016 |
| EP | 1209876 A2 | 5/2002 |
| EP | 1482685 A1 | 12/2004 |
| EP | 1720287 | 11/2006 |
| EP | 2575328 | 10/2008 |
| EP | 2057552 | 5/2009 |
| EP | 2215863 | 8/2010 |
| EP | 2296313 A1 | 3/2011 |
| EP | 2667571 | 11/2013 |
| EP | 2760170 A1 | 7/2014 |
| EP | 2575328 | 11/2014 |
| EP | 2760170 B1 | 12/2015 |
| HK | 1182547 | 11/2013 |
| HK | 1188498 | 5/2014 |
| HK | 1189438 A | 6/2014 |
| HK | 1190539 A | 7/2014 |
| HK | 1182547 A1 | 4/2015 |
| HK | 1199153 A | 6/2015 |
| HK | 1199779 A | 7/2015 |
| HK | 1200617 A | 8/2015 |
| IN | 261CHE2014 A | 7/2016 |
| JP | 2000307634 A | 11/2000 |
| JP | 2004350188 | 12/2004 |
| JP | 2005-518595 | 6/2005 |
| JP | 2006180295 | 7/2006 |
| JP | 2006333245 | 12/2006 |
| JP | 2007048052 | 2/2007 |
| JP | 2011505752 | 2/2011 |
| JP | 5480959 | 2/2013 |
| JP | 2013059122 | 3/2013 |
| JP | 2013070423 | 4/2013 |
| JP | 2013078134 | 4/2013 |
| JP | 5364101 | 9/2013 |
| JP | 5579820 | 7/2014 |
| JP | 5579821 | 7/2014 |
| JP | 2014143686 A | 8/2014 |
| JP | 5906263 B2 | 4/2016 |
| KR | 1020130096624 A | 8/2013 |
| KR | 101576585 B1 | 12/2015 |
| TW | NI086309 | 2/1996 |
| TW | NI109955 | 12/1999 |
| TW | NI130506 | 3/2001 |
| TW | NI137392 | 7/2001 |
| WO | WO2001013228 A2 | 2/2001 |
| WO | WO2001014990 A1 | 3/2001 |
| WO | 2003073216 | 9/2003 |
| WO | 2003103233 | 12/2003 |
| WO | WO2003103237 A1 | 12/2003 |
| WO | 2006065691 | 6/2006 |
| WO | 2007076883 | 7/2007 |
| WO | WO2008053954 A1 | 5/2008 |
| WO | 2008021620 | 6/2009 |
| WO | 2009073295 | 6/2009 |
| WO | WO2011049770 A2 | 4/2011 |
| WO | WO2011079381 A1 | 7/2011 |
| WO | WO2013081952 A1 | 6/2013 |
| WO | WO2013096019 A1 | 6/2013 |
| WO | WO2014031046 A1 | 2/2014 |
| WO | WO2014093829 A1 | 6/2014 |
| WO | WO2015164026 A1 | 10/2015 |

OTHER PUBLICATIONS

Smith, M. et al; "Network Security Using NAT and NAPT", 10th IEEE International Converence on Aug. 27-30, 2002, Piscataway, NJ, USA, 2012; Aug. 27, 2002; pp. 355-360.

Cardellini et al., "Dynamic Load Balancing on Web-server Systems", IEEE Internet Computing, vol. 3, No. 3, pp. 28-39, May-Jun. 1999.

Wang et al., "Shield: Vulnerability Driven Network Filters for Preventing Known Vulnerability Exploits", SIGCOMM'04, Aug. 30-Sep. 3, 2004, Portland, Oregon, USA.

Goldszmidt et al., "NetDispatcher: A TCP Connection Router," IBM Research Report RC 20853, May 19, 1997, pp. 1-31.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," nixCraft [online], Jul. 8, 2009 [retreived on Apr. 13, 2016], Retreived from the Internt: <URL:http://www.cyberciti.biz/faq/linux-tcp-tuning/>, 24 pages.

(56) References Cited

OTHER PUBLICATIONS

FreeBSD, "tcp—TCP Protocol," Linux Programmer's Manual [online], Nov. 25, 2007 [retreived on Apr. 13, 2016], Retreived from the Internet: <URL:https://www.freebsd.org/cgi/man.cgi?query=tcp&apropos=0&sektion=7&manpath=SuSE+Linux%2Fi386+11.0&format=asci>, 11 pages.

"Enhanced Interior Gateway Routing Protocol", Cisco, Document ID 16406, Sep. 9, 2005 update, 43 pages.

Crotti, Manuel et al., "Detecting HTTP Tunnels with Statistical Mechanisms", IEEE International Conference on Communications, Jun. 24-28, 2007, pp. 6162-6168.

Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.

Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.

"EIGRP MPLS VPN PE-CE Site of Origin (SoO)", Cisco Systems, Feb. 28, 2006, 14 pages.

\* cited by examiner

ALLOCATING RESOURCES IN MULTI-CORE COMPUTING ENVIRONMENTS

TECHNICAL FIELD

This disclosure relates generally to data processing and, more particularly, to allocation of resources in multi-core computing environments.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Guaranteeing quality of service (QoS) in computer networking depends on the ability to assign different priority to different data flows, users, or applications, or, in other words, guarantee a certain level of a data flow. Generally, the QoS depends on bandwidth, delay, jitter, packet dropping probability, and/or bit error rate. QoS guarantees are important in networks where the capacity is limited resource and, especially important for realtime or near realtime applications, since these applications often require fixed bandwidth and are delay sensitive.

When multiple users and applications share the same up or down link to transmit network packets, the QoS is needed to guarantee the priority of a user and application traffic, shape the traffic as configured and share the bandwidth efficiently. In a multi-core system, user and application packets can be processed and transmitted by different processing cores. Typically, QoS decisions are also made and coordinated by different cores. QoS algorithms can be very complex as, for example, is the case with hierarchical QoS algorithms. To guarantee the consistency of traffic information and QoS algorithm, only one core can access and execute the QoS algorithm at one time. Typically, locks are used to prevent different cores from executing the same logic at the same time.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for allocating resources in a multi-core computing environment. Specifically, a method for allocating resources in a multi-core computing environment comprises selecting, by one or more processors, at least one dedicated core for execution of a resource allocation algorithm. After selection of the dedicated core, the dedicated core allocates, based on the resource allocation algorithm, a network resource to a client. Furthermore, the dedicated core assigns the network resource to network packets associated with the client for processing by data cores. After the assigning the network resource, the data cores process the network packets according to the allocated network resource.

According to another approach of the present disclosure, there is provided a system for allocating resources in a multi-core computing environment. The system comprises a processor. The processor of the system is operable to select at least one dedicated core for execution of a resource allocation algorithm. The system further comprises a dedicated core. The dedicated core is operable to allocate, based on the resource allocation algorithm, a network resource to a client. Furthermore, the dedicated core is operable to assign the network resource to network packets associated with the client for processing by one or more data cores. The system further comprises data cores operable to process the network packets according to the allocated network resource.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
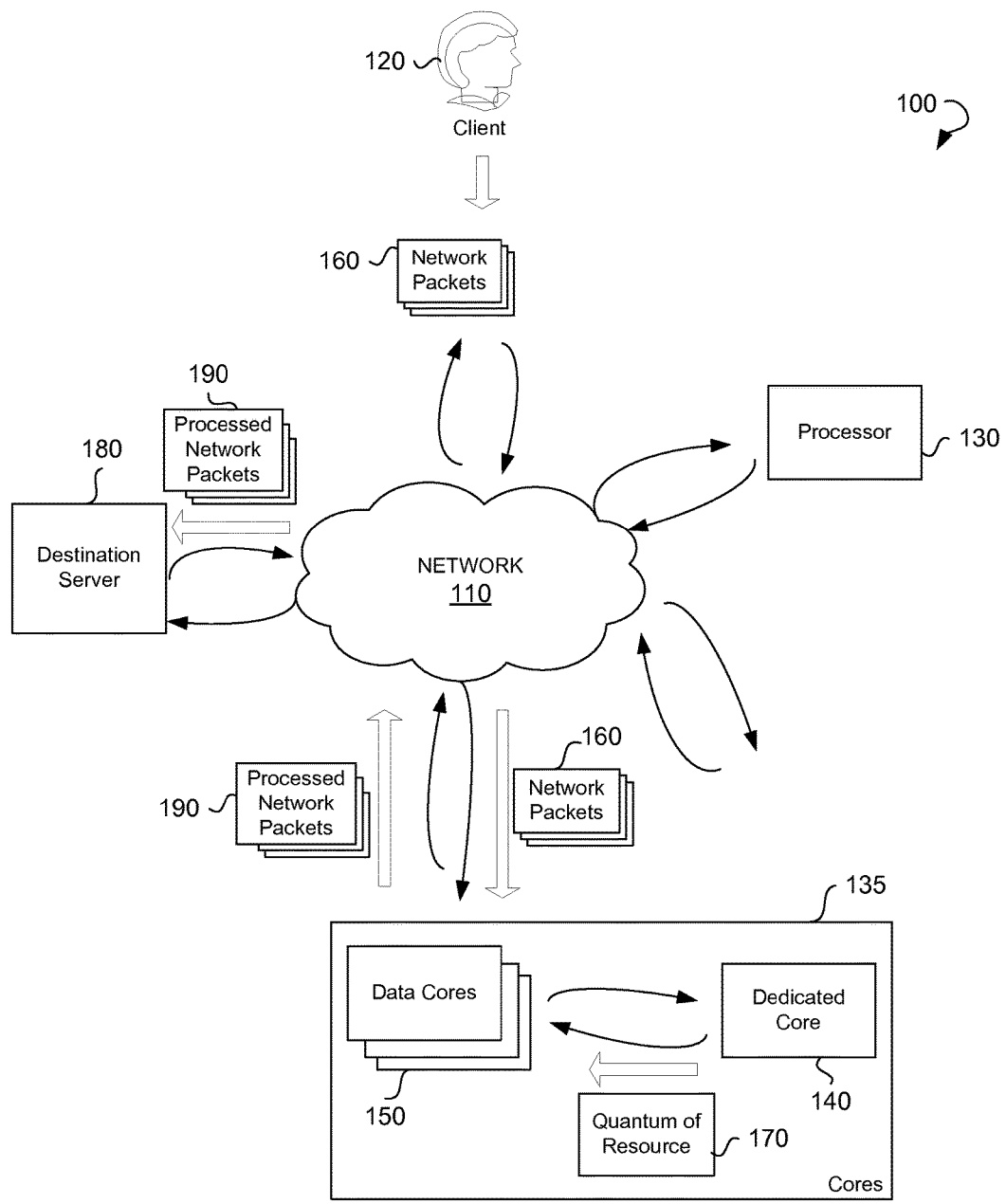
FIG. 1 shows an environment within which method and system for allocating resources in multi-core computing environments are implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques disclosed herein may be implemented using a variety of technologies. For example, the methods described herein can be implemented in software executing on a computer system or in hardware utilizing either a combination of microprocessors or other specially designed application-specific integrated circuits (ASICs), programmable logic devices, or various combinations thereof. In particular, the methods described herein can be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, network devices, such as gateways, routers, switches, and so forth.

As outlined in the summary, the embodiments of the present disclosure refer to allocating resources in a multi-core computing environment. Typically, a resource allocation algorithm can be executed by any CPU cores. According to the present disclosure, QoS, which can also be referred to as traffic shaping, packet shaping, or bandwidth management, is the manipulation and prioritization of network traffic to reduce the impact of heavy use by some users on other users. A network resource throttling or rate limiting is performed to guarantee QoS via efficient use of a network resource. Instead of having every CPU core execute the QoS algorithm, one or more dedicated CPU cores are used to run QoS algorithm. According to the QoS algorithm, the dedicated cores allocate a network resource for a client or application. The dedicated cores assign a quantum of network resource to each data core. The network resource can include a bandwidth, a connection, a data packet, an interface (physical, virtual, or logical), or a combination of network resources. The remaining CPU cores can be referred to as data cores. The data cores process and transmit network packets according to the assigned network resource.

According to the allocation algorithm, a quantum of resource is assigned to data cores in advance. As referred herein, the quantum of resource is a portion of an available network resource. The quantum of resource is divided between data CPU cores based on the total resource available for the client and/or application, resource used by a client and/or application, resource waiting to be used, and so forth. In other words, the quantum of resource is based on the packets processed and queued on a core. Using dedicated cores to allocate network resource and data cores makes complex coordination between CPU cores unnecessary, thereby improving performance and reducing packet delays. The described method can be used for any kind of resource allocation as well as for sharing network resources and limiting excessive use.

Referring now to the drawings, FIG. 1 illustrates an environment 100 within which methods and systems for allocating resources in a multi-core computing environment are implemented. The environment 100 includes a network 110, a client 120, a processor 130, cores 135, a dedicated core 140, data cores 150, network packets 160, a quantum of resource 170, a destination server 180, and processed data packets 190. The cores 135 include the data cores 150 and the dedicated core 140.

The network 110 can include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication.

Communications between the data cores 150 and the dedicated core 140 can be facilitated by any inter-core communications methods, such as, for example, message passing or shared memory. In an example embodiment, the dedicated core 140 and the data cores 150 are located within the same integrated circuit shown in FIG. 1 as cores 135.

The client 120 includes a person or an entity that transmits and/or receives traffic via the network 110. The client 120 also includes one or more of an application, group of applications, a user, a group of users, a host, a group of hosts, a network, a group of networks, and so forth. The processor 130 is responsible for selection of the dedicated core 140. A processor 130 for selection of the dedicated core is optional. The dedicated core 140 is one of the cores responsible for execution of a resource allocation algorithm.

The client 120 sends network packets 160 to a destination server 180 via the network 110. During transmission from the client 120 to the destination server, the network packets 160 are received and processed by the cores 135, specifically, by the data cores 150. The dedicated core 140 selected by the optional processor 130 allocates a network resource to the client 120. Furthermore, dedicated core 140 assigns a network resource to the network packets 160 associated with the client 120 by adding a quantum of resource 170 to the data cores 150. The data cores 150 are responsible for processing network packets. The processing includes sending, receiving, forwarding, consuming, modifying, holding, queuing, delaying, and so forth. The processed data packets 190 are sent from the data cores 150 to the destination server 180.

Figure 2:
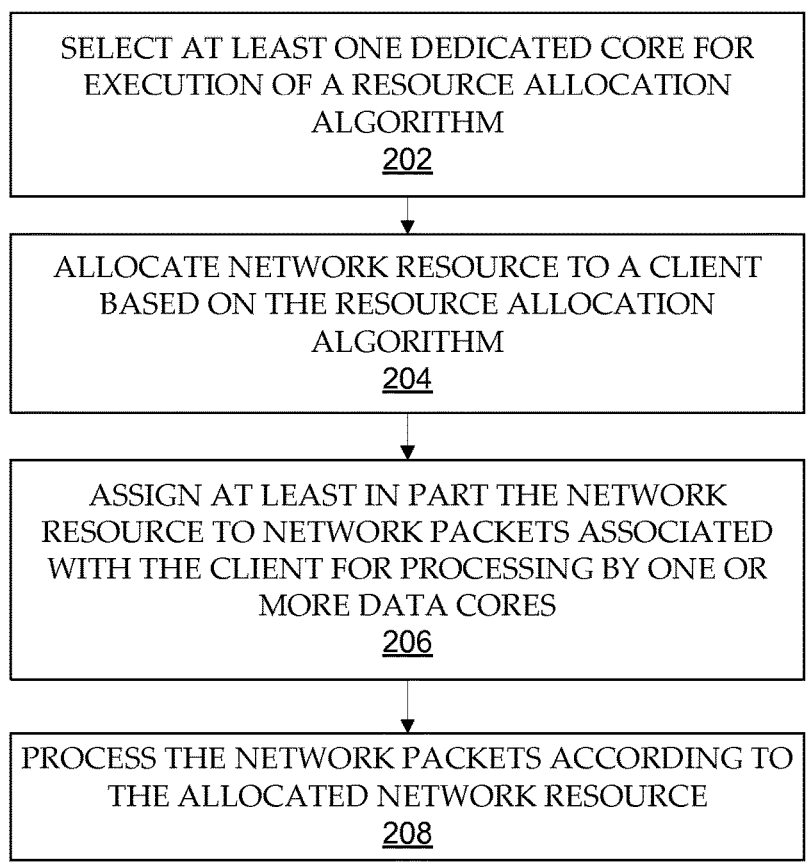
FIG. 2 is a process flow diagram showing a method for allocating resources in a multi-core computing environment.

FIG. 2 is a process flow diagram showing a method 200 for allocating resources in a multi-core computing environment. The method 200 is performed by processing logic that can comprise hardware (e.g., decision making logic, dedicated logic, programmable logic, and microcode), software (such as software run on a general-purpose computer system or a dedicated machine), or a combination of both.

The method 200 commences with selecting at least one dedicated core for execution of a resource allocation algorithm in operation 202. The selection is performed by one or more processors. After selection of the dedicated core, the dedicated core allocates a network resource to a client in operation 204. The allocation is performed based on the resource allocation algorithm. The resource allocation algorithm can include a quality of service algorithm guaranteeing a level of service to the client. In another example embodiment, the resource allocation algorithm is configured to limit resource consumption by the client. Furthermore, the resource allocation algorithm is operable to implement sharing of the network resources between one or more clients.

In various embodiments, the client includes an application, a group of applications, a user, a group of users, a host, a group of hosts, a network, a group of networks. In further embodiments, the client is associated with at least one type of traffic. The type of traffic is a classification or categorization of the traffic based on certain characteristics of the traffic or content of the traffic. The content of the traffic includes, but is not limited to, source IP address and destination IP address, User Datagram Protocol (UDP)/Transmission Control Protocol (TCP) ports, virtual local area network (VLAN) ID, application, and so forth, as indicated in protocol headers. The characteristics of the traffic can relate to statistical aspects, such as size, frequency, latency, primary flow direction, connections, flow geometry, e.g. star (one to many), and the like.

After the network resource is allocated to the client, the dedicated core can assign, based on the allocated network resource, at least in part, the network resource to network packets associated with the client for processing by one or more data cores in operation 206. The assigning of the network resource for processing the network packets includes adding a quantum of resource to the one or more data cores. The quantum of resource is a portion of an available network resource.

In an example embodiment, the quantum of resource is divided on a per data core basis between the one or more data cores based on a number of the network packets queued on a data core. The quantum of resource is periodically computed and readjusted by the dedicated core. Furthermore, the quantum of resource is allocated based on one or more of a total available amount of a network resource, a consumed amount of the network resource, an amount of an allocated network resource, an amount of an available remaining network resource, an amount of a consumed network resource, a total amount of a network resource waiting to be allocated (i.e. the packet waiting to be processed), an amount of a network resource waiting to be processed per core, and so forth.

In operation 208, after assigning, at least in part, the network resource to network packets associated with the client, the data cores process the network packets according to the allocated network resource and processing time limit. More specifically, there are available network resource and a time limit for processing the network packets. Processing the network packets includes one or more of sending, receiving, forwarding, consuming, holding, queuing, delaying, modifying the network packets, and so forth.

Figure 3:
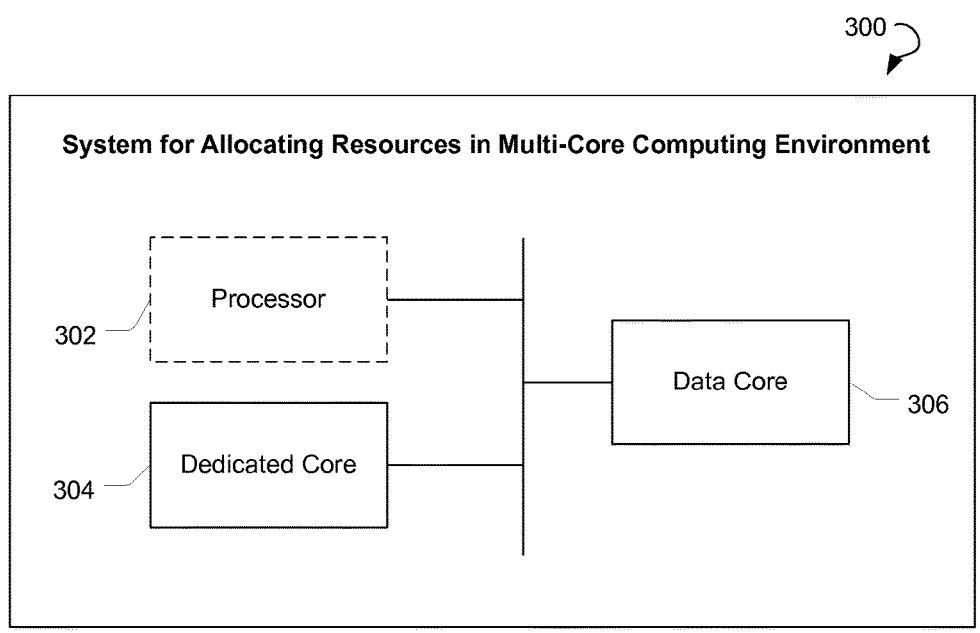
FIG. 3 is a block diagram showing various modules of a system for allocating resources in a multi-core computing environment.

FIG. 3 shows a block diagram showing various modules of a system 300 for allocating resources in a multi-core computing environment. Specifically, the system 300 optionally comprises a processor 302. The optional processor 302 may be operable to select at least one dedicated core for execution of a resource allocation algorithm.

Furthermore, the system 300 comprises at least one dedicated core 304. The dedicated core 304 is operable to allocate a network resource to a client. The allocation is performed based on the resource allocation algorithm. The dedicated core 304 allocates the network resource for processing the network packets by adding a quantum of resource to the one or more data cores. The quantum of resource is a portion of an available network resource. In an example embodiment, the quantum of resource is divided on a per data core basis between the one or more data cores. The quantum of resource is allocated based on one or more of the total available amount of the network resource, a consumed amount of the network resource, an amount of an allocated network resource, an amount of an available remaining network resource, an amount of a consumed network resource, a total amount of a network resource waiting to be allocated (i.e. the packet waiting to be processed), an amount of a network resource waiting to be processed per core, and so forth.

The dedicated core 304 is also operable to assign at least in part the network resource to network packets associated with the client for processing by one or more data cores. Assigning of the network resource for processing of the network packets includes adding a quantum of resource to the one or more data cores).

In an example embodiment, the dedicated core 304 periodically readjusts the quantum of resource and allocates the quantum of resource. The allocation is performed based on the allocated network resource, an amount of an available remaining network resource, an amount of a consumed network resource, an amount of a total network resource waiting to be processed, an amount of a network resource waiting to be processed per core, and so forth.

The system 300 also comprises one or more data cores 306. The data cores 306 are operable to process the network packets. The processing is performed according to the allocated network resource.

Figure 4A:
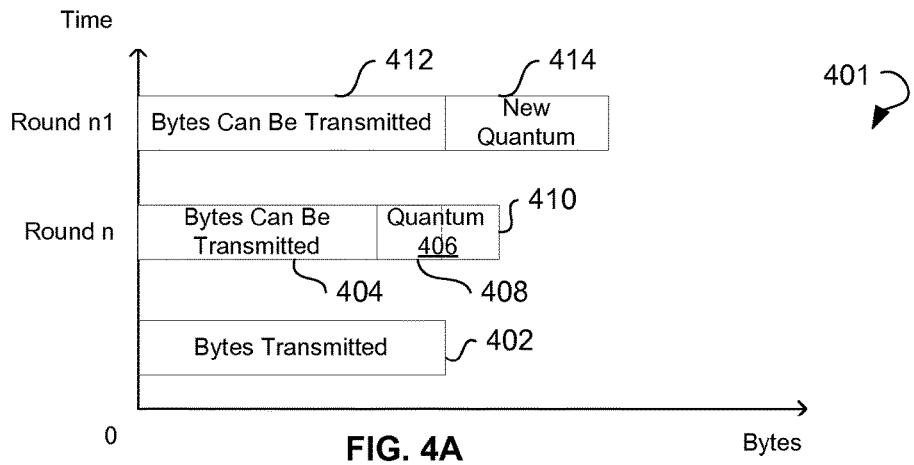
FIGS. 4A, 4B, and 4C are block diagrams showing allocation of network resources.

FIG. 4A shows a block diagram 401 for allocating a network resource showing an amount of bytes sent within a certain period of time. The network resource is allocated based on the total network resource usage of all data core. The network resource can include a bandwidth, a connection, a data packet, an interface (physical, virtual, or logical), or a combination of network resources. According to FIG. 4A, during round n, an amount of 'bytes can be transmitted' 404 and a part 408 of quantum 406 of resource were used for transmitting the amount of 'bytes transmitted' 402. For the next allocation of the network resource shown as round n1, the amount of 'bytes can be transmitted' 412 is equal to the amount of 'bytes transmitted' 402 plus new quantum 414 of resource. The new quantum 414 of resource is the sum of the quantum 406 of resource of round n plus a part 410 of the quantum 406 of resource not used in round n.

Figure 4B:
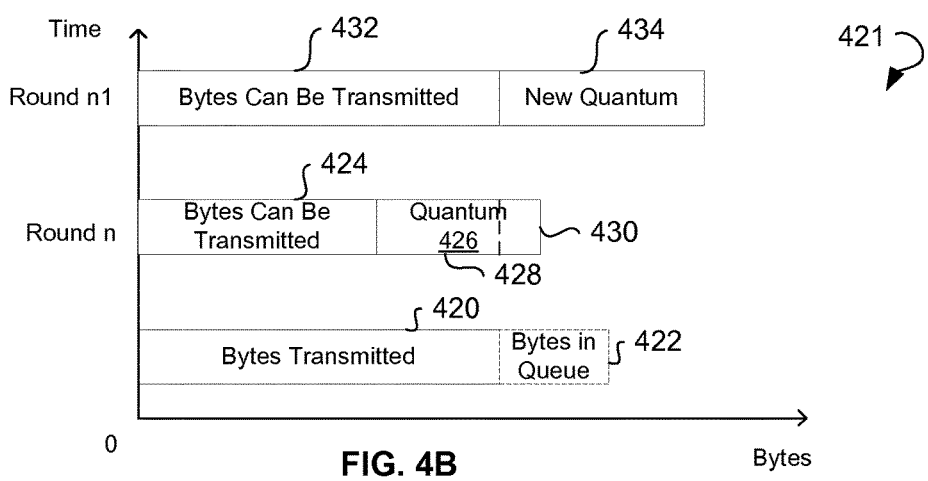

FIG. 4B shows another block diagram 421 for allocating a network resource showing an amount of bytes sent within a certain period of time. During round n, an amount of 'bytes transmitted' 420 was transmitted and a certain amount of bytes shown as 'bytes in queue' 422 left in queue, i.e. was not transmitted. The amount of 'bytes can be transmitted' 424 and a part 428 of the quantum 426 of resource were used for transmission of the amount of 'bytes transmitted' 420 during round n. For the next allocation of the network resource shown as round n1, the amount of 'bytes can be transmitted' 432 is equal to the amount of 'bytes transmitted' 420 plus new quantum 434 of resource. The new quantum 434 of resource is the sum of the quantum 426 of resource of round n plus a part 430 of the quantum 426 of resource not used in round n.

Figure 4C:
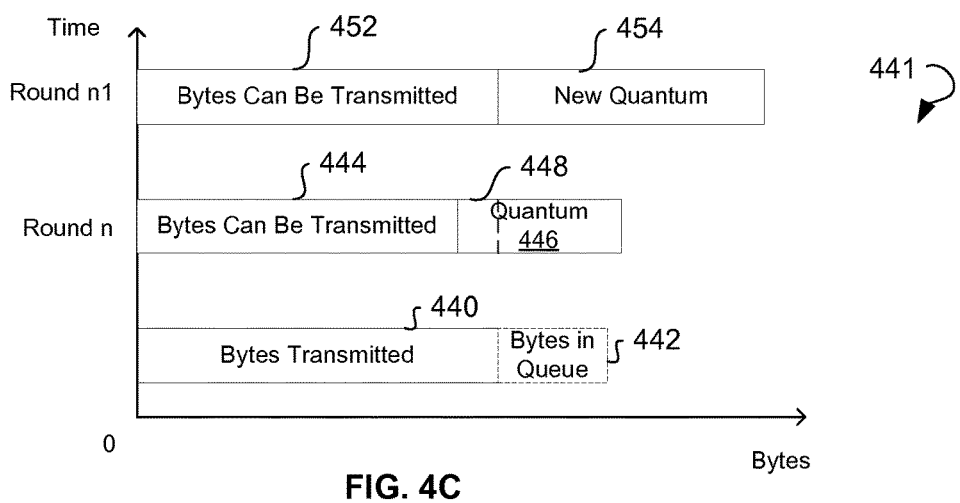

FIG. 4C shows another block diagram 441 for allocating a network resource illustrating an amount of bytes sent within a certain period of time. During round n, an amount of 'bytes transmitted' 440 was transmitted and a certain amount of bytes shown as 'bytes in queue' 442 left in queue, i.e. was not transmitted because round n ran out of time. The amount of 'bytes can be transmitted' 444 and a part 448 of the quantum 446 of resource were used for transmission of the amount of 'bytes transmitted' 440 during round n before. For the next allocation of the network resource shown as round n1, the amount of 'bytes can be transmitted' 452 is equal to the amount of 'bytes transmitted' 450 plus new quantum 454 of resource. The new quantum 454 of resource is the sum of the quantum 446 of resource of round n plus an amount 'bytes in queue' 442 not used in round n. The amount 'bytes in queue' 442 can be added because the quantum 446 of resource was allocated but not used during round n.

Figure 5:
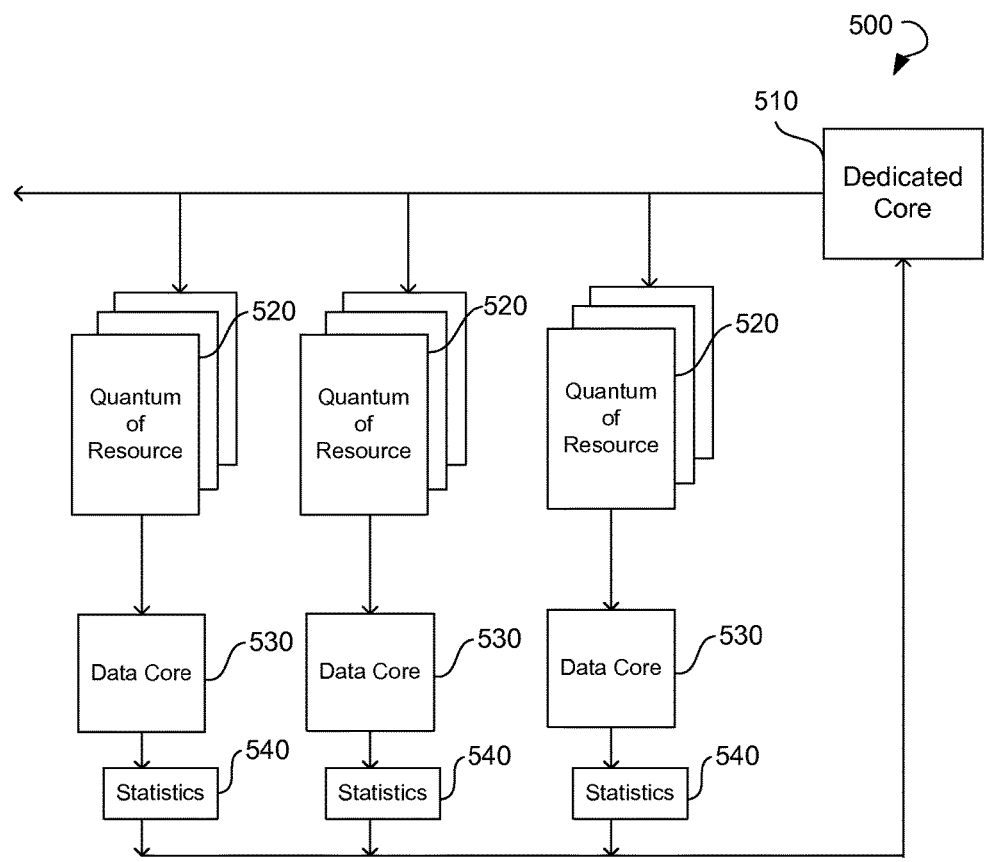
FIG. 5 is a flow charge illustrating allocation of a network resource.

FIG. 5 shows a scheme flow chart for allocation of a network resource. The dedicated core 510 runs a resource allocation algorithm, such as a QoS algorithm. The dedicated core 510 allocates the network resource, such as a bandwidth, adds quantums 520 of resource to the data cores 530. Addition of quantums 520 is performed based on the resource allocation algorithm. The dedicated core 510 collects packet processing statistics 540, such as bytes or packets transmitted, and bytes or packets waiting or queued, and uses the collected statistics in the next allocation of network resource to assign quantum of resource to each data core.

Figure 6:
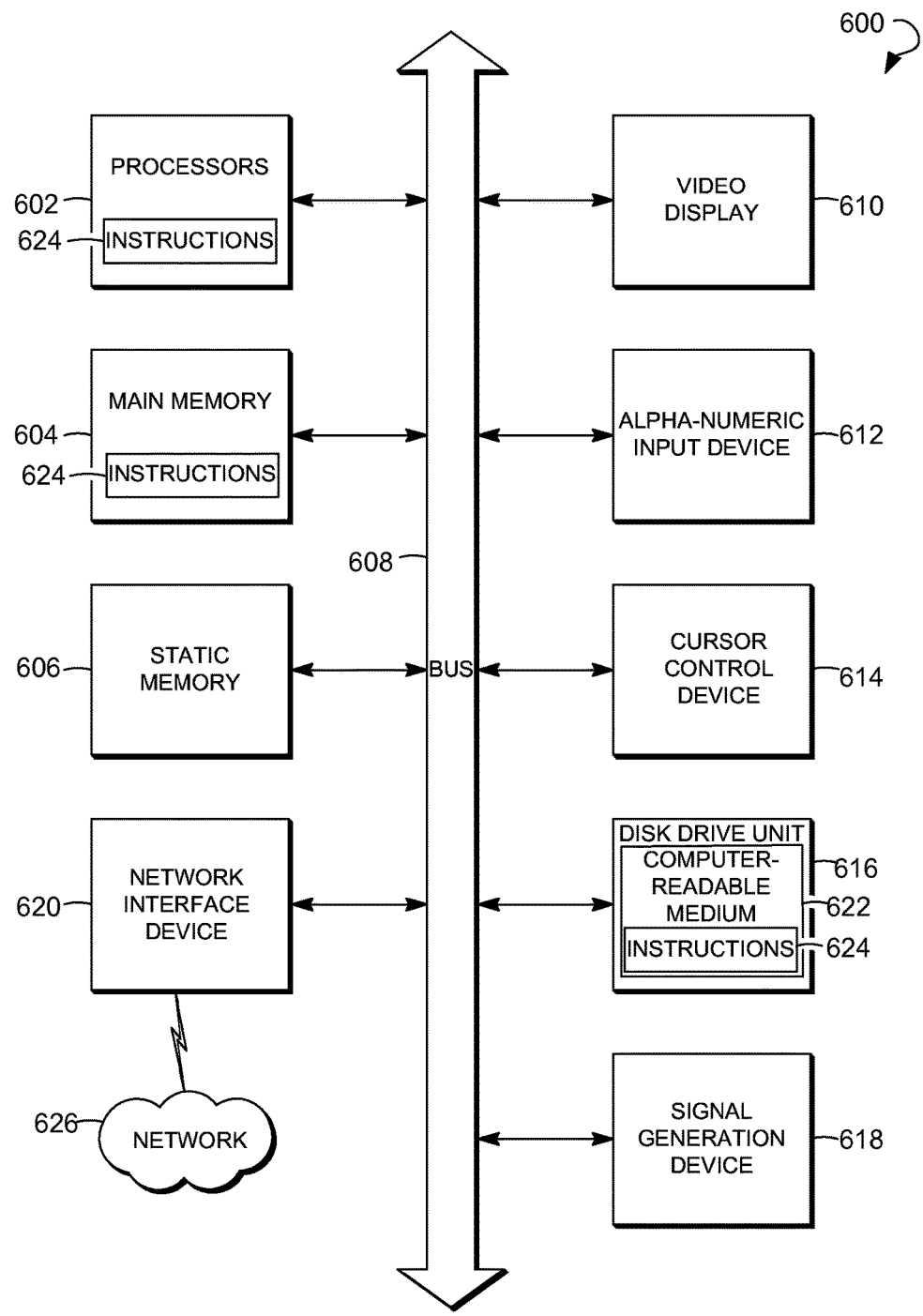
FIG. 6 shows a diagrammatic representation of a computing device for a machine in the example electronic form of a computer system, within which a set of instructions for causing the machine to perform any one or more of the methodologies discussed herein can be executed.

FIG. 6 shows a diagrammatic representation of a machine in the example electronic form of a computer system 600, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 602 (e.g., a CPU, a graphics processing unit (GPU), or both), a main memory 604 and a static memory 606, which communicate with each other via a bus 608. Each of the multiple processors 602 includes a multi-core processor. The computer system 600 may further include a video display unit 610 (e.g., a liquid crystal display (LCD) or a cathode ray tube (CRT)). The computer system 600 may also include an alphanumeric input device 612 (e.g., a keyboard), a cursor control device 614 (e.g., a mouse), a disk drive unit 616, a signal generation device 618 (e.g., a speaker), and a network interface device 620.

The disk drive unit 616 includes a non-transitory computer-readable medium 622, on which is stored one or more sets of instructions and data structures (e.g., instructions 624) embodying or utilized by any one or more of the methodologies or functions described herein. The instructions 624 may also reside, completely or at least partially, within the main memory 604 and/or within the processors 602 during execution thereof by the computer system 600. The main memory 604 and the processors 602 may also constitute machine-readable media.

The instructions 624 may further be transmitted or received over a network 626 via the network interface device 620 utilizing any one of a number of well-known transfer protocols (e.g., Hyper Text Transfer Protocol (HTTP)).

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, methods and systems for allocating resources in a multi-core computing environment have been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method by a first processor core of a plurality of processor cores for allocating resources in a multi-core computing environment, the method comprising:
    assigning a level of service to each client;
    receiving a request from a client;
    determining, by a dedicated core of the plurality of processor cores, the level of service associated with the client;
    executing, by the dedicated core, a resource allocation algorithm, wherein the executing the resource allocation algorithm includes:
        collecting statistics associated with processing of a network traffic associated with the client, the statistics including one or more of a volume of a transmitted network traffic associated with the client and a volume of a queued network traffic associated with the client; and
        based on the statistics, selecting a quantum of a network resource for processing of the network traffic associated with the client;
    allocating, by the dedicated core, using the resource allocation algorithm, the quantum of the network resource to the network traffic associated with the client, the client including at least one client processor, wherein the network resource is allocated to the network traffic associated with the client based on the level of service; and
    assigning, by the dedicated core, using the allocating, other processor cores of the plurality of processor cores to processing network packets of the network traffic associated with the client, the other processor cores processing the network packets according to the allocated quantum of the network resource.

2. The method of claim 1, wherein the processing of the network packets includes one or more of sending, receiving, forwarding, consuming, holding, queuing, delaying, and modifying the network packets.

3. The method of claim 1, wherein the assigning of the other processor cores to processing the network packets includes adding a quantum of the network resource to each of the other processor cores.

4. The method of claim 3, wherein the quantum of the network resource is a portion of an available network resource.

5. The method of claim 3, wherein the quantum of the network resource is allocated to each of the other processor cores using a number of network packets queued on the respective other processor core.

6. The method of claim 5, further comprising:
    readjusting periodically the quantum of the network resource; and
    allocating further the quantum of the network resource, using at least one of the allocated network resource, an amount of an available remaining network resource, an amount of a consumed network resource, a total amount of a network resource waiting to be processed, and an amount of a network resource waiting to be processed by each of the other processor cores.

7. The method of claim 1, wherein the client includes an application or a group of applications.

8. The method of claim 1, wherein the client includes a user or a group of users.

9. The method of claim 1, wherein the client includes a host or a group of hosts.

10. The method of claim 1, wherein the client includes a network or a group of networks, and at least one type of traffic.

11. The method of claim 1, wherein the plurality of processor cores communicate with each other using at least one of message passing and a shared memory.

12. The method of claim 1, wherein the resource allocation algorithm includes a quality of service algorithm guaranteeing the level of service to the client.

13. The method of claim 1, wherein the resource allocation algorithm is configured to limit resource consumption by the client.

14. The method of claim 1, wherein the resource allocation algorithm is operable to implement sharing of the network resources between one or more clients.

15. A system for allocating resources in a multi-core computing environment, the system comprising:
at least one hardware processor configured for:
assigning a level of service to each client; and
selecting a first processor core of a plurality of processor cores as a dedicated core;
the dedicated core configured for:
receiving a request from a client;
determining the level of service associated with the client;
executing a resource allocation algorithm, wherein the executing the resource allocation algorithm includes:
collecting statistics associated with processing of a network traffic associated with the client, the statistics including one or more of a volume of a transmitted network traffic associated with the client and a volume of a queued network traffic associated with the client; and
based on the statistics, selecting a quantum of a network resource for processing of the network traffic associated with the client;
allocating, using the resource allocation algorithm, the quantum of the network resource to the network traffic associated with the client, the client including at least one client processor, wherein the network resource is allocated to the network traffic associated with the client based on the level of service; and
assigning, using the allocating, other processor cores of the plurality of processor cores to processing network packets of the network traffic associated with the client; and
the other processor cores processing the network packets according to the allocated quantum of the network resource.

16. The system of claim 15, wherein the dedicated core allocates the network resource for processing the network packets by adding a quantum of the network resource to each of the other processing cores.

17. The system of claim 15, wherein the quantum of the network resource is a portion of an available network resource.

18. The system of claim 15, wherein the quantum of the network resource is allocated to each of the other processor cores using a number of network packets queued on the respective other processor core.

19. The system of claim 18, wherein the dedicated core periodically readjusts the quantum of the network resource and allocates the quantum of the network resource based on the allocated network resource, an amount of an available remaining network resource, an amount of a consumed network resource, an amount of a total network resource waiting to be processed, and an amount of a network resource waiting to be processed by each of the processor cores.

20. A non-transitory computer-readable storage medium having embodied thereon a program, the program being executable by a first processor core of plurality of processor cores to perform a method for allocating resources in a multi-core computing environment, the method comprising:
assigning a level of service to each client;
receiving a request from a client;
determining, by a dedicated core, the level of service associated with the client;
executing, by the dedicated core, a resource allocation algorithm, the first processor core being selected by a processor as the dedicated core for executing the resource allocation algorithm, wherein the executing the resource allocation algorithm includes:
collecting statistics associated with processing of a network traffic associated with the client, the statistics including one or more of a volume of a transmitted network traffic associated with the client and a volume of a queued network traffic associated with the client; and
based on the statistics, selecting a quantum of a network resource for processing of the network traffic associated with the client;
allocating, by the dedicated core, using the resource allocation algorithm, the quantum of the network resource to the network traffic associated with the client, the client including at least one client processor, wherein the network resource is allocated to the network traffic associated with the client based on the level of service;
assigning, by the dedicated core, using the allocating, other processor cores of the plurality of processor cores to processing network packets of the network traffic associated with the client, the other processor cores processing the network packets according to the allocated quantum of the network resource.

* * * * *